United States Patent
Kim et al.

(10) Patent No.: US 11,593,877 B2
(45) Date of Patent: *Feb. 28, 2023

(54) ORDER EXECUTION FOR STOCK TRADING

(71) Applicant: Qraft Technologies Inc., Seoul (KR)

(72) Inventors: Seong Min Kim, Seoul (KR); Tae Hee Cho, Seoul (KR); Hyo Jun Moon, Seoul (KR)

(73) Assignee: QRAFT TECHNOLOGIES INC., Seoul (KR)

( * ) Notice: Subject to any disclaimer, the term of this patent is extended or adjusted under 35 U.S.C. 154(b) by 151 days.

This patent is subject to a terminal disclaimer.

(21) Appl. No.: 16/698,016

(22) Filed: Nov. 27, 2019

(65) Prior Publication Data

US 2021/0035213 A1 Feb. 4, 2021

(30) Foreign Application Priority Data

Jul. 31, 2019 (KR) .................. 10-2019-0093178

(51) Int. Cl.
*G06Q 40/04* (2012.01)
*G06N 20/00* (2019.01)

(52) U.S. Cl.
CPC ............. *G06Q 40/04* (2013.01); *G06N 20/00* (2019.01)

(58) Field of Classification Search
CPC ............................... G06Q 40/04; G06N 20/00
See application file for complete search history.

(56) References Cited

U.S. PATENT DOCUMENTS 8,296,176 B1 * 10/2012 Chatwin ............ G06Q 30/0271
705/7.29
9,002,757 B2 * 4/2015 Kojima .................. G06N 20/00
706/12

(Continued)

FOREIGN PATENT DOCUMENTS

KR 10-1808259 B1 1/2018
WO WO-2019070589 A1 * 4/2019 ............. G06N 20/00

OTHER PUBLICATIONS

"Brian Ning, Double Deep Q-Learning for optimal Execution, Dec. 17, 2018, Cornell University" (Year: 2018).*

(Continued)

*Primary Examiner* — Kenneth Bartley
*Assistant Examiner* — Gregory M James
(74) *Attorney, Agent, or Firm* — Hamre, Schumann, Mueller & Larson, P.C.

(57) ABSTRACT

An order execution server for stock trading includes a data collection unit configured to collect trading data on at least one item, a subsidiary prediction value generation unit configured to generate a subsidiary prediction value by inputting the trading data into a pre-trained first deep learning model based on supervised learning, an order execution strategy deriving unit configured to derive an order execution strategy for the at least one item during a current period of time based on the trading data and the subsidiary prediction value by using a pre-trained second deep learning model based on reinforcement learning; and an order execution instruction unit configured to instruct order execution for the at least one item during the current period of time by using order information including the order execution strategy.

10 Claims, 6 Drawing Sheets

(56) References Cited

U.S. PATENT DOCUMENTS

| | | | |
|---|---|---|---|
| 2009/0098515 A1* | 4/2009 | Das | G09B 19/18 |
| | | | 434/107 |
| 2019/0042761 A1* | 2/2019 | Wang | G06N 5/043 |
| 2019/0102838 A1* | 4/2019 | Ginis | G06N 20/00 |
| 2019/0114711 A1* | 4/2019 | Yu | G06Q 40/06 |
| 2019/0197244 A1* | 6/2019 | Fong | G06F 21/577 |
| 2019/0244288 A1* | 8/2019 | Singh | G06N 20/00 |
| 2019/0361739 A1* | 11/2019 | Burhani | G06Q 40/00 |
| 2020/0380353 A1* | 12/2020 | Ding | G06N 3/08 |

OTHER PUBLICATIONS

Young Jae Joo, Jul. 27, 2019, "Developer Trading Algorithm Trading".

LG CNS Information Technology Institute, Apr. 16, 2018, "Machine learning technology from reward".

K Hyun Kim, Feb. 17, 2016, "How did Google Alpha Go win the game?".

* cited by examiner

ORDER EXECUTION FOR STOCK TRADING

TECHNICAL FIELD

The present disclosure relates to execution of orders for stock trading.

BACKGROUND

A securities company is entrusted by institutional clients, such as asset management companies, to buy and trade stocks, often in large quantities, and receives a commission from the clients in return.

If the securities company sells or buys the a large sum of stocks as part of a block order, the stock price may sharply fall or rise in the stock market, making it difficult to trade stocks at a right price.

For this reason, securities companies often implement an algorithmic trading system that enables a large order for stocks to be executed in parts. However, conventional algorithmic trading systems execute orders in parts according to predetermined rules and, thus, often lack agility to respond appropriately to changes in a respective stock market. For example, a trading system using a time-weighted average price (TWAP) algorithm executes an order in equally divided parts as time passes, and thus necessarily has low market adaptability and low efficiency.

SUMMARY

The present disclosure pertains to a reinforcement learning-based deep learning model so as to derive a strategy for executing an order, i.e., sale or purchase, for at least one item based on trading data for the at least one item; and to execute the order for the at least one item in real time by using order information that includes the order execution strategy.

The problems to be solved by the present disclosure are not limited to the above-described problems.

As described and recited herein, a server for executing stock transactions, i.e., buying and selling one or more stocks, includes a data collection unit configured to collect trading data on at least one item, a subsidiary prediction value generation unit configured to generate a subsidiary prediction value by inputting the trading data into a pre-trained first deep learning model based on supervised learning, an order execution strategy deriving unit configured to derive an order execution strategy for the at least one item during a current period of time based on the trading data and the subsidiary prediction value by using a pre-trained second deep learning model based on reinforcement learning; and an order execution instruction unit configured to instruct order execution for the at least one item during the current period of time by using order information including the order execution strategy.

According to another aspect of the present disclosure, a method for executing stock trades by an order execution server includes collecting trading data on at least one item, generating a subsidiary prediction value by inputting the trading data into a pre-trained first deep learning model based on supervised learning, deriving an order execution strategy for the at least one item during a current period of time based on the trading data and the subsidiary prediction value by using a pre-trained second deep learning model based on reinforcement learning, and instructing order execution for the at least one item during the current period of time by using order information including the order execution strategy.

The embodiments described above are provided by way of illustration only and should not be construed as limiting. There may be additional embodiments described in the accompanying drawings and the detailed description.

As described, recited, and even suggested herein, it is possible to train a model for mode-based deep reinforcement learning so as to derive a strategy for executing one or more stock transaction orders for at least one item on the basis of trading data on the at least one item and to execute the order for the at least one item in real-time by using order information including the order execution strategy.

Therefore, according to the present disclosure, multiple deep learning models are trained continuously based on market data, and, thus, an order execution strategy suitable for the current market can be derived. Further, according to the present disclosure, an order execution strategy optimized for changes in the market can be derived, and, thus, it is possible to minimize losses that might be caused by executing a large order.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
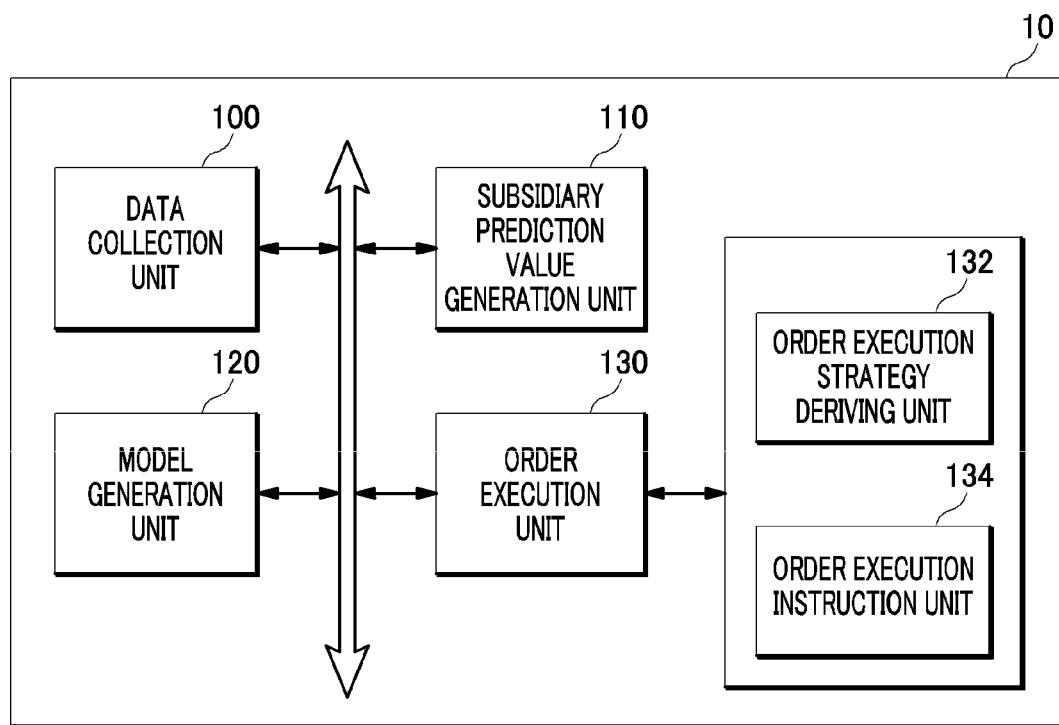
FIG. 1 is a block diagram illustrating an order execution server, in accordance with various embodiments described herein.

Hereafter, embodiments of the present disclosure will be described in detail with reference to the accompanying drawings so that the present disclosure may be readily implemented by a person with ordinary skill in the art. However, it is to be noted that the present disclosure is not limited to the embodiments described herein. In the drawings, parts that may not be relevant to the description may be omitted for the simplicity of explanation, and like reference numerals denote like parts throughout the whole document.

As referenced herein, the term "connected to" or "coupled to" that is used to designate a connection or coupling of one element to another element pertains to both an element being "directly or physically connected or coupled to" another element as well as an element being "electronically connected or coupled to" another element via still another element. Further, it is to be understood that the term "comprises or includes" and/or "comprising or including" used herein implies that one or more other components, steps, operation, and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

As referenced herein, the term "unit" includes a unit implemented by hardware or software, either singularly or in combination. For example, one unit may be implemented by two or more pieces of hardware, and two or more units may be implemented by one piece of hardware.

As described, recited, and suggested herein, some of operations or functions described as being performed by a device may alternatively, or in combination, be performed by a server connected to the device. Likewise, some of operations or functions described as being performed by a server may alternatively, or in combination, be performed by a device connected to the server.

Hereafter, embodiments will be described in detail with reference to the accompanying drawings.

FIG. 1 is a block diagram illustrating an order execution server 10 in accordance, with various embodiments described herein.

Referring to FIG. 1, an order execution server 10 may include a data collection unit 100, a subsidiary prediction value generation unit 110, a model generation unit 120, and an order execution unit 130. Herein, the order execution unit 130 may include an order execution strategy deriving unit 132 and an order execution instruction unit 134. However, the order execution server 10 illustrated in FIG. 1 is just an example and may be modified in various ways based on the components illustrated in FIG. 1.

Model generation unit 120 may generate a first deep learning model based on supervised learning and train the generated first deep learning model. Herein, the first deep learning model based on supervised learning may be a deep neural network including, for example, an attention network, a recurrent neural network, or the like.

In accordance with a first non-limiting example, the first deep learning model is programmed, designed, and/or configured to extract the macro-trade patterns during the day. That is, the first deep learning model is to roughly predict future trade patterns.

The second deep learning model derives a strategy in detail based on the extracted macro-trade patterns.

The structure of the first deep learning model, in accordance with at least one non-limiting example is described as follows:

With respect to an item (or a stock), a beta coefficient, an OHLC (an Open-High-Low-Close chart) and a transaction ratio of trade participants are input into the first deep learning model.

Input data is converted to a matrix data including batch size, time, and features. Matrix data is updated by performing CNN (convolutional neural network) operation on the features for the noted time included in the matrix data, and the updated matrix data includes the batch size, the time, and encoded features.

Additional features may be extracted using LSTM (Long Short-Term Memory) from the batch size, the time, and the encoded features for each time value noted in the updated matrix data.

A latent vector is extracted based on the batch size, the time, the encoded features and the additional features.

An average and dispersion of a predicted stock price is output based on the latent vector.

NLL (Negative Log Likelihood) is calculated between the predicted stock price and an actual stock price based on the average and dispersion of the predicted stock price. The NLL which may be used as a loss function of the first deep learning model is minimized by training the first deep learning model.

A swish activation function (swish(x)=x*sigmoid(x)) is used as an activation function of the first deep learning model.

The model generation unit 120 may input collected trading data on at least one item into the first deep learning model and train the first deep learning model to predict a rate of change of the stock price of the item at predetermined time intervals.

In accordance with at least one example embodiment, the input data for training and validation data are prepared.

The first deep learning model is trained by using the input data.

After training the first deep learning model during a predetermined step (tolerance step), the validation data is input into the first deep learning model so that the first deep learning model output a validation loss.

If the validation loss does not decrease anymore, the training is accomplished.

Herein, the trading data for the at least one item input into the first deep learning model may include, for example, trading price information of the item as traded by securities companies, requested price window data, macroeconomic index data, and the like.

For example, the model generation unit 120 may train the first deep learning model to predict a rate of change for the stock price at which output values of the first deep learning model for the at least one item at predetermined time intervals follow a reference stock price rate of change of the item at each time interval.

To this end, the model generation unit 120 may train the first deep learning model to minimize a mean squared error (MSE) between a reference rate of change for the stock price of an item at each predetermined time interval and a rate of change for the stock price of the item at each unit time interval that is an output value of the first deep learning model.

For example, an example iteration may contemplate a first reference rate of change for the stock price at a first time point (e.g., 1 hour later), a second reference rate of change for the stock price at a second time point (e.g., 2 hours later), and an Nth reference rate of change for the stock price at an Nth time point (e.g., N hours later). Accordingly, the model generation unit 120 may train the first deep learning model such that when trading data for the first item is input into the first deep learning model, a first rate of change for the stock price from the first deep learning model that is output at the first time point matches the first reference rate of change for the stock price rate of change; a second rate of change for the stock price from the first deep learning model that is output at the second time point matches the second reference rate of change for the stock price; and an Nth rate of change for the stock price from the first deep learning model that is output at the Nth time point matches the Nth reference rate of change for the stock price.

The model generation unit 120 may generate and/or implement a second model for model-based deep reinforcement learning including two or more actors, e.g., neural networks, that determine an action policy for a reinforcement learning agent, and a critic, e.g., a neural network, that estimates an action value of the reinforcement learning agent and trains the generated second deep learning model.

The second model includes a feature-embedding network, an actor network, and a critic network branched from the feature embedding network.

A structure of the feature embedding network is same as the first deep learning model.

The actor network including a first actor, a second actor, and a third actor performs a gradient ascent training to maximize a Q function, which is the same as an action value.

The critic network, which includes a first critic and a second critic performs a gradient descent training (it is also well known technique) so that the critic network minimizes difference between the Q function and an actual Q value (the Q value is an actual action value) to predict a more accurate Q function.

The critic network is trained so that the Q function is almost same as the Q value. That is, when the critic network is trained enough, the Q function is almost same as the Q value.

The trained actor network outputs a Q function (the action value) and the trained actor network trains the actors based on the Q function.

The second model includes a feature embedding network and an actor network and a critic network branched from the feature embedding network.

A structure of the feature embedding network is same as the first deep learning model.

The actor network including a first actor, a second actor and a third actor performs a gradient ascent training to maximize Q function, which may the same as an action value.

The critic network, including a first critic and a second critic, performs a gradient descent training, so that the critic network minimizes difference between the Q function and an actual Q value (the Q value is an actual action value) to predict a more accurate Q function.

The critic network is trained so that the Q function is almost same as the Q value. That is, when the critic network is trained enough, the Q function is almost same as the Q value.

The trained actor network outputs a Q function (the action value) and the trained actor network trains the actors based on the Q function.

The second model includes a feature embedding network and an actor network and a critic network branched from the feature embedding network.

A structure of The feature embedding network is same as the first deep learning model.

The actor network, including a first actor, a second actor and a third actor performs a gradient ascent training to maximize Q function (the Q function is same as an action value).

The critic network, including a first critic and a second critic performs a gradient descent training so that the critic network minimizes difference between the Q function and an actual Q value (the Q value is an actual action value) to predict a more accurate Q function.

The critic network is trained so that the Q function is almost same as the Q value. That is, when the critic network is trained enough, the Q function is almost same as the Q value.

The trained actor network outputs a Q function (the action value) and the trained actor network trains the actors based on the Q function.

The model generation unit 120 may train the second model for mode-based deep reinforcement learning to derive an order execution strategy for at least one item based on collected trading data on the at least one item.

The model generation unit 120 may input the collected trading data for the at least one item into the second deep learning model and train the second deep learning model to derive an order execution strategy for reducing slippage cost and order execution cost for the item in market conditions for an ultra-short period of time.

Herein, the trading data for the at least one item input into the second deep learning model may include, for example, market price data (trading price and trading volume), market business hour information, existing order transaction volume, and the like.

The model generation unit 120 may train the second deep learning model to determine a reward for an order execution strategy (derived by the second deep learning model) in a reinforcement learning environment and maximize the determined reward. As referenced herein, a reward may refer to a ratio of vwap to a market vwap, whereby vwap indicates that the reinforcement learning agent has contracted orders. The market vwap is an actual vwap.

Herein, the reinforcement learning environment is a virtualized model of a stock market environment. Further, the reward may indicate whether or not an order is transacted according to an order execution strategy and whether the cost associated with executing the order was reduced compared to a volume-weighted average price (VWAP), and, if so, by how much.

A virtual simulation environment may be designed based on an actual limit order book, tick data, etc. In the virtual simulation environment, the probability of cancelation of an order by market price movement is given as a parameter.

At the time of training, the agent decides on orders and requests the orders based on information on the limit order book. If a market price order is given, a closing price is calculated based on the current quotation. For example, when a first sale quotation contemplates 80 shares and 50 shares for a second sale quotation, if 100 shares are given as the market price order, 80 shares will be sold based on the first sale quotation and 20 shares will be sold at the second sale quotation.

If a limit order is given, the order of the specified order is calculated based on the current limit order book. For example, if there are 80 shares at a first purchase quotation, the limit order is not executed until the 80 shares have been contracted or canceled.

Figure 2:
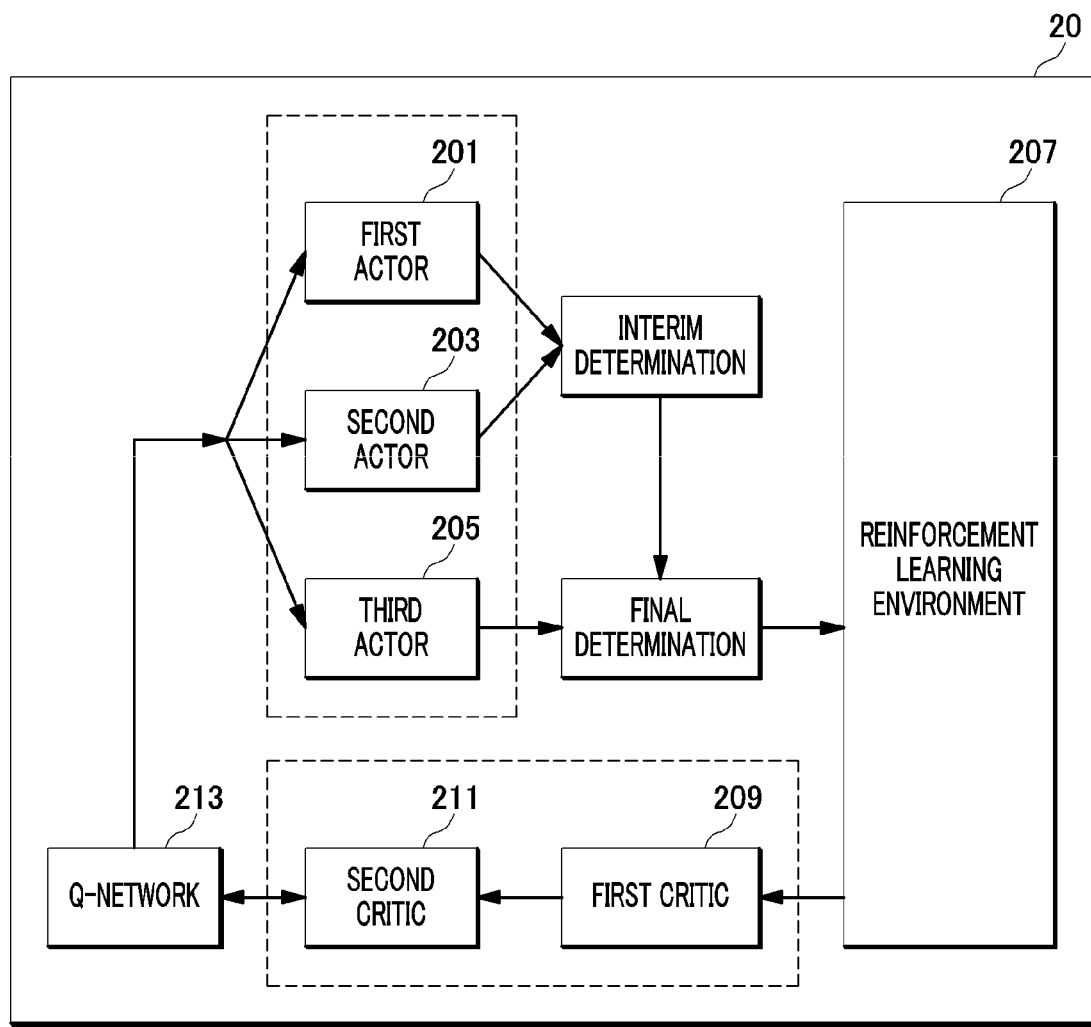
FIG. 2 is a block diagram illustrating operations for training a deep learning model based on reinforcement learning, in accordance with various embodiments described herein.

Referring to FIG. 2, a second deep learning model 20 may include actors 201, 203, and 205, which may be neural networks that determine an action policy for a reinforcement learning agent, and one or more critics, which may be neural networks that estimate an action value for the reinforcement learning agent. When an input state and an action of the reinforcement learning agent is given, each critic estimates a Q function, i.e., an action value.

Herein, actors 201, 203, and 205 may include, at least, first actor 201 that determines an order volume for at least one item, and second actor 203 that determines an order cancellation volume for the at least one item. The determinations of the respective actors depend on the output of the actor network after training the second deep learning model. That is, when the input S is given after the second deep learning model is trained, the output of neural networks defined as an "actor" is the same as the result of the actor's operation.

Actors 201, 203, and 205 may, alternatively, include a third actor 205 that determines a final order volume for the at least one item based on the order volume determined by first actor 201 and the order cancellation volume determined by second actor 203.

The model generation unit 120 may train two or more of actors 201, 203, and 205 to improve a reward for an order execution strategy based on trading data in the reinforcement learning environment. That is, the actor network may perform a gradient ascent training to maximize θ (θ=a Q function predicted by the critic network−entrophy) with regard to parameters of the actor networks. For example, the model generation unit 120 may train the first actor 201 to determine an order volume for at least one item and train the second actor 203 to determine an order cancellation volume for the item.

Herein, the sum of the order volume determined by the first actor 201 and the order cancellation volume determined by the second actor 203 appears as a zero-centered structure. This structure may be helpful in learning to determine a net order volume. That is, zero-center structure facilitates stable training because, e.g., if the scale is 0 to 1, then the output trends towards extremes of 0 and 1, which is not conducive to stable training, i.e., the agent's behavior is not stable.

The model generation unit 120 may train the third actor 205 to determine a net order volume based on the order volume determined by first actor 201 and the order cancellation volume determined by second actor 203.

Note that the first, second, and third actors are not trained individually, but rather are trained simultaneously when training the second deep learning model. When training the second deep learning model, each of the outputs of the first, second, and third actors is combined to extract the result of the action; and as a result, the critic's Q function is updated. The critic network updates the Q function to minimize MSE, as described earlier, between the Q function and a given Q value in the environment. The actor network updates an action policy to maximize the Q value, when updating the first, second, and third actors simultaneously.

Thus, model generation unit 120 may train the third actor 205 to derive an order execution strategy for the at least one item in real-time (i.e., asked price window distribution strategy for the net order volume) based on the net order volume determined by third actor 205. Then, order execution unit 130 may execute the order in a reinforcement learning environment 207 according to the net order volume determined by third actor 205 and the order execution strategy for the at least one item in real-time.

Meanwhile, critics 209 and 211 may estimate a state value to estimate a final order volume of the multiple actors 201, 203, and 205 and a reward for the result of an order execution strategy in the reinforcement learning environment 207. That is, critics 209 and 211 may estimate a state value to estimate Q function used by actors 201, 203, and 205 with an iterative bellman equation. Second critic 211 may update the state value by applying a reward average method (e.g., polyak-ruppert averaging) to the calculated reward to stabilize the estimate.

Herein, since reward estimation by a first critic 209 is unstable, the reward average method is used to more stably estimate a reward by introducing a moving average and the like. It is noted that an unstable estimate is based on an inaccurate Q function when the critic network is updated. Thus, there is a target value network, and therefore the target value network is also updated. The moving average refers to a target value network in step n and a target value network in step n+1, and is thus an updated target value network from the target value network in step n.

The model generation unit 120 may generate an agent model that may include multiple actors 201, 203, and 205 and the multiple critics 209 and 211.

The model generation unit 120 may train the first critic 209 and the second critic 211.

The model generation unit 120 may train the agent model through interactions between the agent model and an environment. Herein, the environment provides a reward for the result of action of the agent model.

The agent model training may include, e.g., the agent receiving S1 from the environment as a specific observation state; based on the received S1, the agent takes an action A and providing the reward R as feedback on S1 and S2 as a next observation state to the environment; the model generation unit updating the state value network and the Q network with polyak-ruppert averaging based on the S1, A, R, A2; and further, the model generation unit updating the actor network. The foregoing may be repeated until the end of training.

The model generation unit 120 may store, in a replay buffer, result information (e.g., the agent model's state, action, reward, etc.) obtained from interactions between the agent model and the environment.

The model generation unit 120 may extract the result information stored in the replay buffer and train the agent model.

To estimate a state value of a specific state, the model generation unit 120 may train the first critic 209 and the second critic 211 to minimize a difference between the state value and an expected state value of the specific state when the specific state is input. That is, the actor network is updated for each actor to output an accurate action policy based on the action value of the critic network.

A Q-network 213 may estimate an action value of critics 209 and 211 based on the reward applied with the reward average method. The estimated action value of critics 209 and 211 may be used to train multiple actors 201, 203, and 205.

Critics 209 and 211 may be trained off-policy, i.e., regardless of policy network or actor policy, which may change during training, by using the Q-network 213. In this case, Q-network 213 is also trained. For example, the Q-network 213 may be trained to output a value similar to the bootstrapped action value of critics 209 and 211 from the reward applied with the reward average method. In this case, Q-network 213 may be trained to minimize a mean squared error (MSE). Herein, the action value of critics 209 and 211 may be calculated by adding the reward to the state value.

The model generation unit 120 may train the two or more actors 201, 203, and 205 to improve the action value estimated by the Q-network 213.

Figure 3:
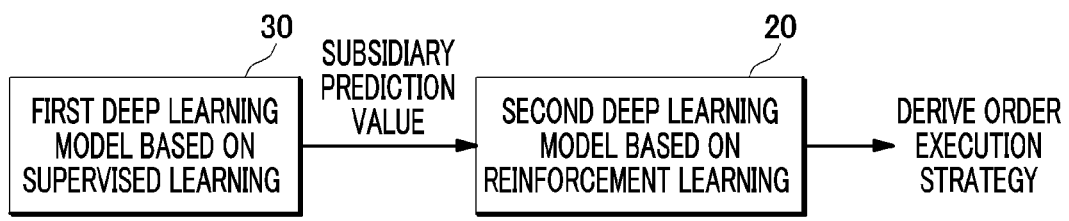
FIG. 3 is a block diagram illustrating operations for deriving an order execution strategy for an item in real time, in accordance with various embodiments described herein.

Referring to FIG. 1 and FIG. 3, the data collection unit 100 may collect trading data for at least one item. Herein, the trading data for the at least one item may include, for example, requested price window data on the item, market price data (trading price and trading volume), market business hour information, existing order transaction volume, and the like. Subsidiary prediction value generation unit 110 may input collected trading data on at least one item into a pre-trained first supervised deep learning model 30 to generate a subsidiary prediction value of the item. Herein, the subsidiary prediction value may be, for example, a volume curve. The volume curve is a graph that shows the total daily trading volume to be traded over time. For example, subsidiary prediction value generation unit 110 may generate a subsidiary prediction value applied with a risk tendency of a client through the first deep learning model 30 into which training data are input as an input value. The subsidiary prediction value pertains to volume weighted average price (VWAP). For example, if an increase in a stock price is expected from the beginning of trading towards the end of, a VWAP may be derived to buy more towards the end of trading.

For example, if trading data on at least one item are input into the first deep learning model and the first deep learning model predicts a stock price rate of change for the item at predetermined unit time intervals, subsidiary prediction value generation unit 110 may generate a subsidiary prediction value based on the predicted rate of change for the stock price of the item at the predetermined unit time intervals.

Further to the example, the subsidiary prediction value generation unit 110 may generate a VWAP curve corresponding to a volume-weighted average price (VWAP) by applying the predicted stock price rate of change for the item at the predetermined unit time intervals and risk tendency information of the client to the day's stock price directionality of the item, and derive a volume curve which is an optimum subsidiary prediction value by modifying the generated VWAP curve.

Meanwhile, if order execution is performed according to the volume curve generated by the subsidiary prediction value generation unit 110, orders are likely to be traded at an undesirable price for a short period of time.

That is, if order execution is performed simply according to the volume curve, trades may be made at market price, otherwise it may be difficult to respond to changes in market conditions for a shorter period of time, which may result in an increase in total order cost.

To solve this problem, an order execution strategy (e.g., asked price window distribution strategy for the total order volume) is derived through the second deep learning model based on reinforcement learning. Thus, the total order cost can be minimized. That is, as described, recited, and suggested herein, the second deep reinforcement learning model may be used to optimize slippage cost and order execution cost for a microscopic order execution strategy in market conditions for an ultra-short period of time.

The order execution strategy deriving unit 132 may input the trading data on the at least one item collected together with the subsidiary prediction value generated by the first deep learning model 30 into the pre-trained second deep learning model 20 based on reinforcement learning, and derive, from the second deep learning model 20, an order execution strategy based on the trading data and the subsidiary prediction value.

The order execution strategy deriving unit 132 may derive, from the second deep learning model 20, an order execution strategy for at least one item during a current period of time based on the trading data and the subsidiary prediction value.

For example, the order execution strategy deriving unit 132 may determine an order volume of an item based on the subsidiary prediction value through the first actor of the second deep learning model 20 and may also determine an order cancelation volume of the item based on the subsidiary prediction value through the second actor.

The order execution strategy deriving unit 132 may determine a final order volume of the item through the third actor based on the order volume determined by the first actor and the order cancellation volume determined by the second actor.

The order execution strategy deriving unit 132 may derive an order execution strategy for the item during a current period of time based on the final order volume determined by the third actor.

Herein, the order execution strategy may include at least one of a cumulative order volume, an additional order volume (additional buy/sell order or cancel order) during a current period of time compared to a previous period of time, and asked price window distribution information about the additional order volume during the current period of time. Herein, the cumulative order volume and the additional order volume may be a final order volume determined by the third actor.

That is, the order execution strategy may include a cumulative order volume or additional order volume of an item which changes depending on market conditions, and an asked price window distribution strategy.

The order execution strategy deriving unit 132 may derive an order execution strategy for distributing the cumulative order volume or additional order volume to multiple asked price windows (including market price).

Further, the order execution strategy deriving unit 132 may modify the order execution strategy according to changes in market conditions during a current period of time.

For example, the order execution strategy deriving unit 132 may increase or cancel orders in each asked price window based on the cumulative order volume or additional order volume and the asked price window distribution information.

According to the present disclosure, it is possible to derive an order execution strategy for maximizing the discounted future compensation for at least one item through the second deep learning model 20 based on reinforcement learning.

For example, an order to buy V number of stocks A may be received before time point T. In this case, if the transaction volume so far is v and the elapsed time is t, the order execution strategy deriving unit 132 may derive an order execution strategy for minimizing cost, compared to the VWAP, for buying remaining stocks (V-v) in the current situation up to the time point T.

Further, according to the present disclosure, it is possible to optimize a balance between short-term compensation according to an order execution strategy and a future long-term compensation and thus possible to minimize order execution cost at a current time point.

The order execution unit 130 may use order information including the order execution strategy to instruct order execution for the at least one item during current period of time.

Furthermore, the order execution instruction unit 134 may use order information including the order execution strategy modified according to market conditions at the current time point to instruct order execution for the at least one item during current period of time.

The order execution instruction unit 134 may instruct order execution for the at least one item for the at least one item during current period of time by transmitting the order information including the order execution strategy to a stock trading management server.

Then, the model generation unit 120 may determine a reward for an order execution strategy executed in a real stock market, retrain the second deep learning model 20 based on the determined reward, and retrain the first deep learning model by using trading data on an item for which order execution is completed.

Meanwhile, it would be understood by those skilled in the art that each of the data collection unit 100, the subsidiary prediction value generation unit 110, the model generation unit 120, the order execution unit 130, the order execution strategy deriving unit 132, and the order execution instruction unit 134 can be implemented separately or in combination with one another.

Figure 4:
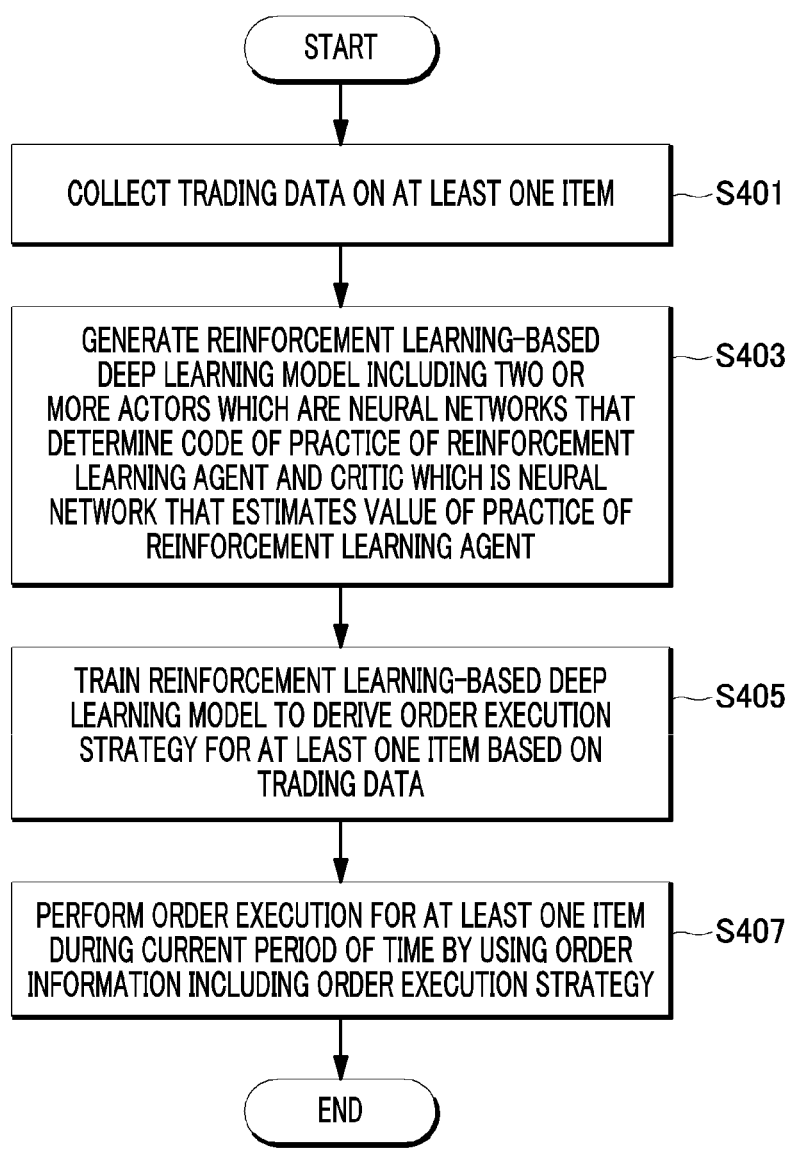
FIG. 4 is a block diagram illustrating operations for executing an order for an item for stock trading, in accordance with various embodiments described herein.

FIG. 4 is a block diagram illustrating a method of executing an order for an item for stock trading in accordance with various embodiments described herein.

Referring to FIG. 4, in process S401, the order execution server 10 may collect trading data on at least one item.

In process S403, the order execution server 10 may generate a reinforcement learning-based deep learning model including two or more actors which are neural networks that determine an action policy of a reinforcement learning agent and a critic which is a neural network that estimates an action value of the reinforcement learning agent.

In process S405, the order execution server 10 may train the reinforcement learning-based deep learning model to derive an order execution strategy for the at least one item based on the collected trading data.

In process S407, the order execution server 10 may perform order execution for the at least one item during a current period of time by using order information including the order execution strategy.

In the descriptions above, the processes S401 to S407 may be divided into additional processes or combined into fewer processes depending on an exemplary embodiment. In addition, some of the processes may be omitted and the sequence of the processes may be changed if necessary.

Figure 5:
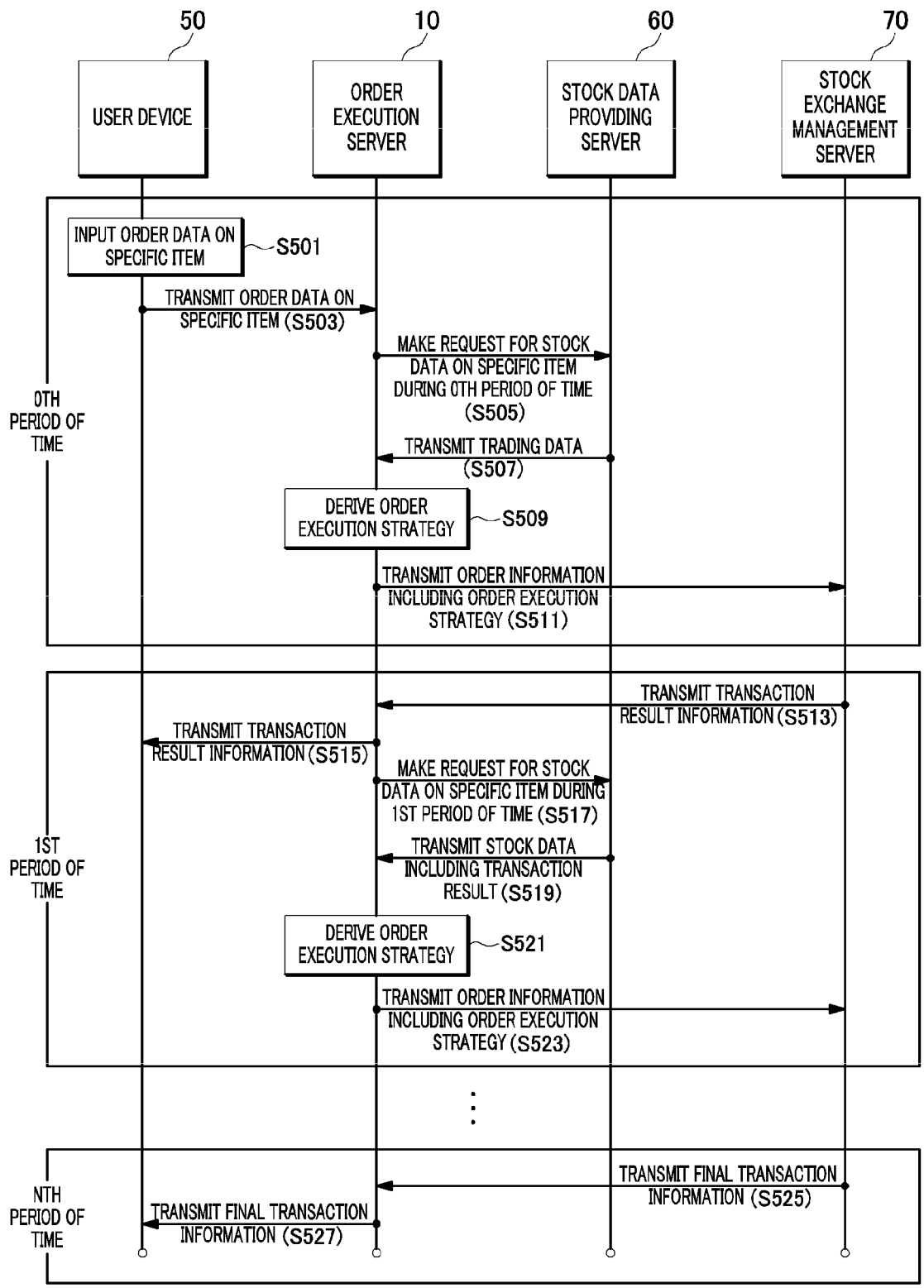
FIG. 5 is a flowchart showing operations for performing order execution, in accordance with various embodiments described herein.

FIG. 5 is a flowchart showing a method of performing order execution in accordance with various embodiments described herein.

Figure 6:
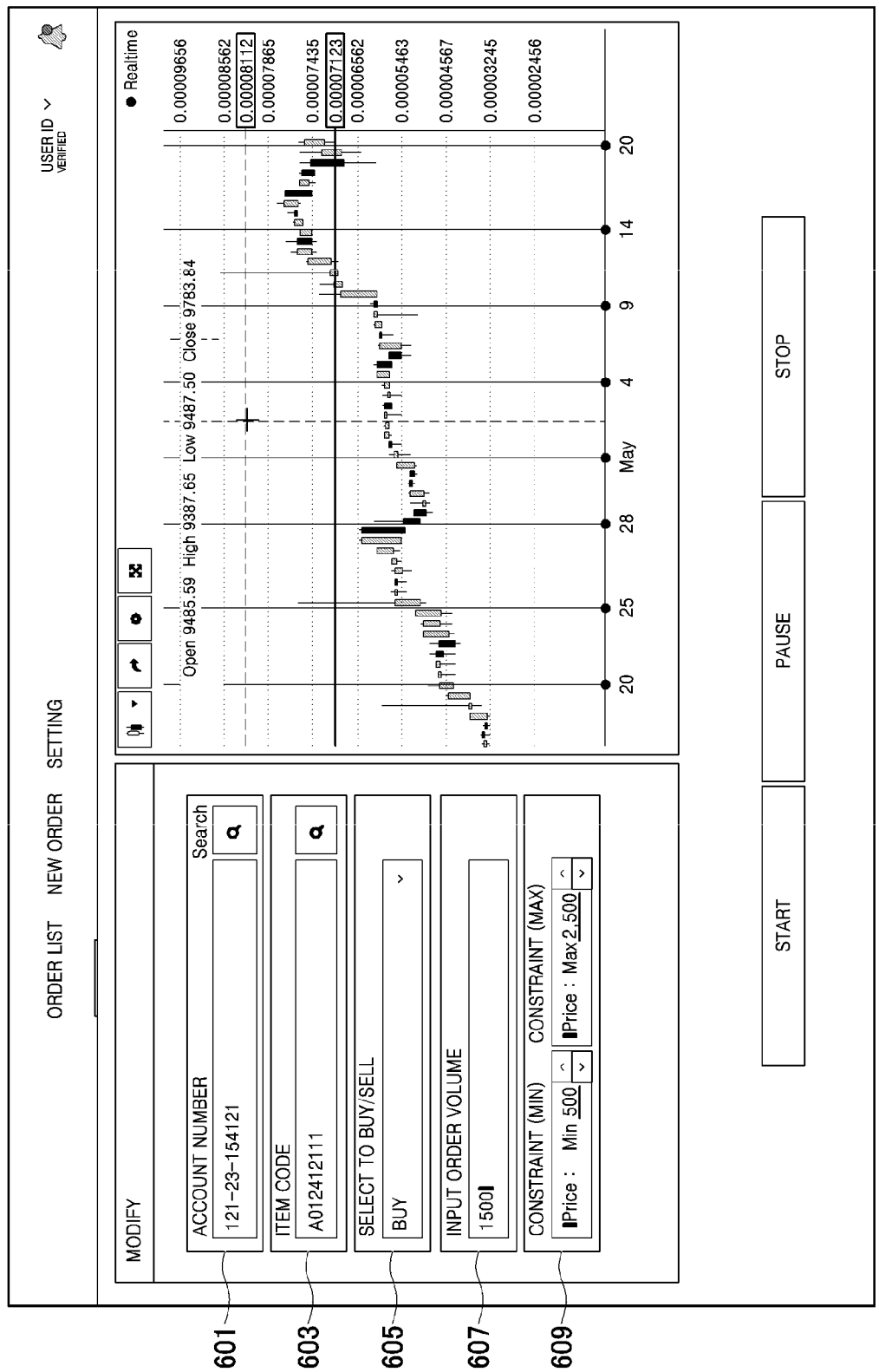
FIG. 6 shows an interface for executing an order, in accordance with various embodiments described herein.

Referring to FIG. 5, in process S501, a user device 50 may receive order data on a specific item from a user. Herein, the order data may include order type information, order deadline information, order volume information, order code information, and order constraint for the specific item. For example, the user device 50 may receive order data on the specific item through an order setup interface illustrated in FIG. 6. The user may set up an account number 601 of the specific item, order deadline information (not shown), order code information 603, order type information 605, order volume information 607, and order constraint information 609 through the order setup interface of the user device 50. Herein, the order deadline information (not shown) may include the order deadline for selling or buying the specific item, and the order code information 603 may include code information of the specific item (e.g., code information of Samsung Electronics). The order type information 605 may include selection information on whether to sell or buy stocks of the specific item, and the order volume information 607 may include an order volume of the specific item based on the selected order type information. The order constraint information 609 may include, for example, the limit of TWAP orders.

In process S503, the user device 50 may transmit order data on the specific item to the order execution server 10.

In process S505, the order execution server 10 may make a request for stock data on the specific item during a 0th period of time to a stock data providing server 60. Herein, the stock data may include asked price window data, trading tick data, and the like.

In process S507, the order execution server 10 may receive stock data on the specific item during the 0th period of time from the stock data providing server 60.

In process S509, the order execution server 10 may derive an order execution strategy for the 0th period of time based on the received order data on the specific item and the received stock data on the specific item during the 0th period of time.

In process S511, the order execution server 10 may transmit, to a stock trading management server 70, order information including the derived order execution strategy for the 0th period of time.

In process S513, the order execution server 10 may receive, from the stock trading management server 70, transaction result information about the order information during the 0th period of time.

In process S515, the order execution server 10 may transmit, to the user device 50, the transaction result information received from the stock trading management server 70.

In process S517, the order execution server 10 may make a request for stock data on the specific item during a 1st period of time to the stock data providing server 60.

In process S519, the order execution server 10 may receive, from the stock data providing server 60, stock data (stock data applied with the transaction result about the order information during the 0th period of time) on the specific item during a 1st period of time.

In process S521, the order execution server 10 may derive an order execution strategy for the 1st period of time based on the received order data on the specific item and the stock data on the specific item during the 1st period of time.

In process S523, the order execution server 10 may transmit, to the stock trading management server 70, order information including the derived order execution strategy for the 1st period of time.

In process S525, if the stock trading management server 70 completes orders for the specific item according to the order volume information included in the order data on the specific item input through the user device 50, the stock trading management server 70 may transmit, to the order execution server 10, final transaction information of the specific item. If orders for the specific item are not completed, the processes after process S513 may be repeated until the orders are completed.

In process S527, the order execution server 10 may transmit, to the user device 50, the final transaction information received from the stock trading management server 70.

In the descriptions above, the processes S501 to S527 may be divided into additional processes or combined into fewer processes depending on an exemplary embodiment. In addition, some of the processes may be omitted and the sequence of the processes may be changed if necessary.

The embodiment of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage medium includes all volatile/non-volatile and removable/non-removable media embodied by a certain method or technology for storing information such as computer-readable instruction code, a data structure, a program module or other data.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method for training a model for mode-based deep reinforcement learning, the method comprising:
    receiving order data on at least one item transmitted from a user device;
    collecting trading data on the at least one item;
    generating a first deep learning model in a neural network to extract macro-trade patterns from the trading data;
    training the first deep learning model on training data and validation data until a validation loss value of a rate of change of a stock price of the at least one item between the training data and validation data stops decreasing;
    generating a second deep learning model in the neural network based on reinforcement learning including two or more actors that determine an action policy for a reinforcement learning agent and a critic that estimates an action value of the reinforcement learning agent and trains the second deep learning model,
    wherein the two or more actors are trained simultaneously and used to perform a gradient ascent training to maximize the action value and the critic is used to perform a gradient descent training to minimize a difference between the estimated action value and an actual action value to increase accuracy of the action value, and
    wherein the second deep learning model is trained for mode-based deep reinforcement learning to derive an order execution strategy for the at least one item in which a reward is determined for the order execution strategy in an reinforcement learning environment, wherein the reinforcement learning environment is a virtualized stock market environment, and wherein the action policy is a zero-centered structure;
    generating a subsidiary prediction value by inputting the trading data into the pre-trained first deep learning model;
    deriving an order execution strategy for the at least one item during a current period of time based on the trading data and the subsidiary prediction value generated by the pre-trained first deep learning model by inputting the trading data and the subsidiary prediction value into the pre-trained second deep learning model based on reinforcement learning environment;
    instructing order execution for the at least one item during the current period of time by using order information including the order execution strategy;
    transmitting the order information to a stock trading management server to execute the order for the at least one item; and
    transmitting the executed order to the user device.

2. The method of claim 1, further comprising:
    retraining the second deep learning model based on a determined reward based on the executed order, and
    retraining the first deep learning model by using trading data on the at least one item of the executed order.

3. The method of claim 1, wherein the training of the first deep learning model comprises minimizing a mean squared error between a reference rate of change for the stock price of the at least one item and a rate of change for the stock price of the at least one item.

4. The method of claim 1, wherein the two or more actors include:
    a first actor that determines an order volume of the at least one item; and
    a second actor that determines an order cancellation volume of the at least one item.

5. The method of claim 4, wherein the two or more actors include a third actor that determines a final order volume of the at least one item based on the order volume determined by the first actor and the order cancellation volume determined by the second actor.

6. The method of claim 5, wherein
    the first actor is trained to determine an order volume of the at least one item for the current period of time based on the subsidiary prediction value, and
    the second actor is trained to determine an order cancellation volume of the at least one item for the current period of time based on the subsidiary prediction value.

7. The method of claim 5, wherein the third actor is trained to determine a final order volume based on the order volume determined by the first actor and the order cancellation volume determined by the second actor.

8. The method of claim 1, wherein the critic includes:
    a first critic that calculates a reward based on a result of performing order execution according to the order execution strategy; and
    a second critic that updates the calculated reward by a reward average method.

9. The method of claim 8,
    wherein the first critic is trained to calculate a reward based on a result of performing order execution according to the order execution strategy, and
    the second critic is trained to update the calculated reward by a reward average method.

10. The method of claim 1, wherein the subsidiary prediction value is a volume curve.

* * * * *